US006862977B2

(12) United States Patent
Glinsner et al.

(10) Patent No.: US 6,862,977 B2
(45) Date of Patent: Mar. 8, 2005

(54) PISTON

(75) Inventors: Karl Glinsner, Wels (AT); Martin Olejniczak, Lambach (AT)

(73) Assignee: ERP-Rotax GmbH & Co. KG, Gunskirchen (AT)

( * ) Notice: Subject to any disclaimer, the term of this patent is extended or adjusted under 35 U.S.C. 154(b) by 0 days.

(21) Appl. No.: 10/395,719

(22) Filed: Mar. 25, 2003

(65) Prior Publication Data

US 2003/0221553 A1 Dec. 4, 2003

Related U.S. Application Data

(60) Provisional application No. 60/366,527, filed on Mar. 25, 2002.

(51) Int. Cl.$^{7}$ .................................................. F16J 1/04

(52) U.S. Cl. ............................. 92/209; 92/208; 92/237

(58) Field of Search .......................... 92/209, 214, 232, 92/237, 208

(56) References Cited

U.S. PATENT DOCUMENTS

| | | | | | |
|---|---|---|---|---|---|
| 2,705,667 | A | * | 4/1955 | Fahlman et al. | 92/232 |
| 4,683,808 | A | | 8/1987 | Landau et al. | |
| 4,715,267 | A | * | 12/1987 | Richmond | 92/232 |
| 4,989,559 | A | | 2/1991 | Fletcher-Jones | |
| 5,076,225 | A | * | 12/1991 | Tokoro et al. | 92/208 |
| 6,152,016 | A | | 11/2000 | Bahr et al. | |
| 6,152,017 | A | | 11/2000 | Harrer et al. | |
| 6,502,539 | B2 | | 1/2003 | Ribeiro et al. | |

FOREIGN PATENT DOCUMENTS

| | | | |
|---|---|---|---|
| DE | 3425965 | A1 | 1/1985 |
| DE | 196 43 778 | A1 | 5/1998 |
| DE | 101 45 589 | A1 | 4/2003 |
| DE | 101 45 589 | | 4/2003 |
| EP | 0 385 390 | A1 | 9/1990 |
| EP | 0 385 390 | | 9/1990 |
| EP | 0 838 587 | | 4/1998 |
| EP | 0 838 587 | A1 | 4/1998 |
| GB | 2 238 596 | A | 6/1991 |
| WO | WO 00 72116 | | 11/2000 |
| WO | 00/72116 | A2 | 11/2000 |

OTHER PUBLICATIONS

Report Issued on 2$^{nd}$ International Seminar, High Performance Spark Ignition Engines for Passenger Cars, Nov. 23–24, 1995.

European Search Report dated Oct. 3, 2003, for EP 1 348 859, which is the European counterpart of the above–captioned U.S. Patent Application.

* cited by examiner

*Primary Examiner*—Edward K. Look
*Assistant Examiner*—Michael Leslie
(74) *Attorney, Agent, or Firm*—BRP Legal Services

(57) ABSTRACT

A light weight piston for an internal combustion engine is disclosed that minimizes the stresses found in a transition area between the piston head and the associated piston pin bosses while maintaining a flexible soft connection between the piston skirts and the piston head. The piston includes a pair of piston skirts having tapered edges. Flared connecting walls are provided such that the distance between the connecting walls is minimized adjacent a pair of piston pin bosses and the distance between the connecting walls is maximized adjacent a portion of the tapered edges. The connecting wall flares in a generally outward direction such that at least a portion of the inner surfaces of the connecting wall has a generally convex curvature.

28 Claims, 5 Drawing Sheets

PISTON

CROSS REFERENCE TO RELATED APPLICATIONS

This application claims priority to U.S. Provisional Patent Application No. 60/366,527, which was filed on Mar. 25, 2002.

BACKGROUND OF THE INVENTION

1. Field of the Invention

The present invention relates to pistons for internal combustion engines. In particular, the present invention relates to a piston having configuration that achieves flexible support of the skirt sections of the piston while minimizing stresses in a transition area between the piston bosses and the piston head.

2. Description of Related Art

In an internal combustion engine, each cylinder has piston slidably received therein. The piston is operatively connected to a crankshaft in a crankcase through a connecting rod. The connecting rod is typically connected to the piston by a piston pin. The piston pin is received within a pair of piston pin bosses that are either formed in or connected to the piston. Typically, pistons are formed with skirt sections on opposing sides of the piston pin bosses. The outer surfaces of the skirt sections serve to stabilize the piston within the cylinder during operation. The outer surfaces of the skirt sections confront the cylinder wall during the combustion cycle to take up side loads imparted on the piston in order to keep the piston aligned with the cylinder during operation.

The skirt sections are typically joined to each other and the piston pin bosses by connecting walls. The connecting walls serve to support the skirt sections and connect the piston pin bosses to the underside of the piston head. In order to achieve flexible or variable or soft support for the skirt sections such that the skirt sections maintain sufficient contact with the sides of the combustion chamber, it is desirable to locate the connecting walls as far apart as possible. On the other hand, in order to minimize stress in the transition area between the piston boss and the underside of the piston head, it is advantageous to have the smallest possible distance between the connecting walls. In the pistons currently known in the art, only one of these conditions can be optimized. The profile of the piston skirt in the vertical direction of reciprocation is typically flat with the slightly tapered ends to provide smooth guidance of the skirt up and down in the cylinder.

For example, DE 196 43 778 C2 discloses a light weight piston. The piston includes a pair of skirt sections that are located on opposing sides of a pair of piston pin bosses. The skirt sections are connected together by spatially curved connecting walls. The connecting walls are convexly curved in the direction of an outer side of the piston. These connecting walls, however, do not optimally support the piston pin bosses. This arrangement, also, causes major stresses in the transition area between the piston pin bosses and the underside of the piston head.

EP 0 835 390 A1 discloses another light alloy piston. The piston includes supporting skirt sections that are joined to each other by connecting walls. The skirt sections and the connecting walls are arranged in the shape of an H. The connecting walls extend in an area of the inner lateral faces of the piston pin bosses and are concave in the direction of the outer side of the piston. With this construction, the piston pin bosses are well connected to the underside of the piston head to minimize stress. This construction, however, produces a rather rigid or stiff support for the skirt sections. This produces piston noise.

DE 34 25 965 A1 also discloses a light alloy piston having flat connecting walls between the skirt sections are flat. With this arrangement, it is possible to provide flexible or variable support for the skirt sections. The piston pin bosses, however, are not joined to the underside of the piston head in an optimal manner. As such, major stresses can occur in the transition area between the piston pin bosses and the underside of the piston head, which may lead to cracking in extreme operating conditions.

U.S. Pat. No. 4,989,559 to Fletcher-Jones discloses a piston for an internal combustion engine. The piston pin bosses of the piston are supported by a pair of planar webs and a plurality of support ribs.

GB 2 238 596 A describes a piston with pin bosses and skirt sections that are joined to each other by connecting walls. The connecting walls are arranged in the area of the outer lateral face of the pin bosses, and are shaped so as to curve convexly outward. This connection to the underside of the piston head introduces major stresses.

An Ω piston having piston-pin bosses and skirt sections that are joined to each other by connecting walls is described in Innovating Piston for High Performance 4 Stroke Engine, drawing and development, by U. Panzeri, Gilardoni Vittorio S. P. A., 2nd International Seminar "High Performance Spark Ignition Engines for Passenger Cars," 23rd to 24th November, 1995, Milano, Italy. When viewed in plan view, the skirt sections and the connecting walls take the shape of an Ω. This arrangement achieves even and precise clearance between the piston and the cylinder. The connecting walls are arranged near the inner lateral face of the piston pin bosses. Each connecting wall is curved in an S-shape between the area of the piston pin bosses and the skirt sections. With the Ω-piston arrangement, although the support for the skirt sections is relatively flexible, the stress distribution in the transition area between the piston boss and the underside of the piston head is not favorable.

WO 00/72116 discloses a method of producing a box piston. The connecting walls are arranged adjacent an inner surface of each of the piston pin bosses. The lower free ends of each of the connecting walls curve in one direction away from a center plane of the box piston.

EP 0838 587 A1 discloses a piston having a pair of skirt sections with concavely tapered edges when viewed from a plane of symmetry bisecting the piston. The connecting walls are following the curvature of the tapered edges of the skirt sections.

OBJECTS OF THE INVENTION

It is an object of the present invention to provide a light weight piston that overcomes the deficiencies of the prior art piston assemblies.

It is another object of the present invention to provide a low-weight durable piston that minimizes stress in the transition area between the piston pin bosses and the piston head.

It is another object of the present invention to provide a low-weight durable piston that provides flexible or soft support for the piston skirt.

It is another object of the present invention to provide a low-weight durable piston that minimizes stress in the transition area between the piston pin bosses and the piston head while providing flexible or soft support for the piston skirt.

It is another object of the present invention to provide a piston having a connecting wall that extends between the piston skirts and the piston pin boss that has a flared construction.

It is another object of the present invention to provide a piston having a connecting wall that is curved in multiple directions to permit the distance between adjacent walls to be the smallest adjacent the piston pin bosses.

It is another object of the present invention to provide a piston having a connecting wall that is curved in multiple directions to permit the distance between adjacent walls to be at it greatest adjacent the piston skirt.

It is another object of the present invention to provide a piston having a pair of tapered piston skirts.

It is another object of the present invention to provide a piston having a pair of tapered piston skirts and connected walls that are curved to follow the taper of the piston skirts.

It is another object of the present invention to provide a piston having a pair of connecting walls extending between the opposing piston skirts having a flared construction.

It is another object of the present invention to provide a piston having a pair of connecting wall having two fold curvature wherein the walls curve in more than one direction.

SUMMARY OF THE INVENTION

In response to the foregoing challenges, applicants have developed a piston for an internal combustion engine that minimizes the stresses found in a transition area between the piston head and the associated piston pin bosses while maintaining a flexible soft connection between the piston skirts and the piston head.

In accordance with the present invention, the piston includes a piston head having an underside. A piston ring carrier extends from the underside of the piston head. A pair of piston pin bosses are connected to underside of the piston head. Each piston pin boss includes an inner surface. The piston pin bosses are arranged in a spaced apart relationship such that the inner surface of one piston pin boss is spaced from the inner surface of the other piston pin boss. The piston further includes a pair of piston skirts extending from the outer periphery of the piston ring carrier. Each of the piston skirt includes a free end and a pair of opposed edges. The opposed edges extend from the piston ring carrier to the free end. One of the piston skirts is positioned on one side of the axis and the other of the piston skirts is positioned on the other side of the axis. The piston further includes a pair of connecting walls that extend between the pair of opposing piston skirts and the pair of piston pin bosses. Each connecting wall is connected to the piston head. Each connecting wall extends from one edge of piston skirt to an edge of the opposed piston skirt. Each connecting wall flares in a generally outward direction in both the vertical and horizontal directions. In accordance with the present invention, at least a portion of each of the connecting walls is aligned with the inner surface on one of the piston pin bosses. The connecting walls are configured such that at least a portion of the opposing inner surfaces of the connecting walls is convexly curved with respect to the opposite connecting wall in at least two planes.

In accordance with the present invention, each of the piston skirts may be tapered such that the distance between the opposing edges adjacent the free ends is greater than distance between the opposing edges adjacent the piston ring carrier. The connecting walls are flared and configured to follow a contour of the opposing edge.

In accordance with the present invention, each of the connecting walls is configured such that a portion of the connecting wall adjacent the piston pin boss is positioned closer to a plane than a portion of the connecting wall adjacent the opposing edge of the piston skirt.

The present invention is also directed to a piston for an internal combustion engine having a piston head having an underside. The piston head includes a piston axis extending in a generally longitudinal direction. A piston ring carrier extends from the underside of the piston head. The piston ring has an outer periphery. A pair of piston pin bosses are connected to the piston head whereby the piston pin bosses are arranged along a boss axis in a spaced apart relationship. The boss axis is substantially perpendicular to the piston axis. The piston includes a first plane containing the piston axis and the boss axis. One piston pin boss is located on one side of the piston axis and another piston pin boss is located on an opposite side of the piston axis. A pair of piston skirts extends from the outer periphery of the piston ring carrier. One of the pair of piston skirts is located on one side of the first plane Another of the piston skirts is located on an opposite side of the first plane. Each piston skirt includes a free end and a pair of opposed edges. A pair of connecting walls extend from one of the piston skirts on one side of the first plane, across a piston pin boss to the other piston skirt on the opposite side of the first plane. Each connecting wall is connected to the piston head.

In accordance with the present invention, a first reference plane extends generally parallel to and spaced from the first plane. The first reference plane intersects each of the connecting walls along an intersecting curve. Each of the connecting walls is at least partially convexly curved with respect to the opposing connecting wall at the intersecting curve. The intersecting curve has a length. In accordance with the present invention, at least 15% of the connecting wall along the length of the intersecting curve is convexly curved. It is preferable that at least 25% of the connecting wall along the length of the intersecting curve is convexly curved. It is more preferable that at least 50% of the connecting wall along the length of the intersecting curve is convexly curved.

The present invention further includes a second reference plane that extends generally orthogonal to the first plane and the first reference plane. The second reference plane intersects each of the connecting walls along a second intersecting curve. Each of the connecting walls is at least partially convexly curved with respect to the opposing connecting wall at the second intersecting curve. The second intersecting curve has a length. At least 15% of the connecting wall along the length of the second intersecting curve is convexly curved. It is preferable that at least 25% of the connecting wall along the length of the second intersecting curve is convexly curved. It is more preferable that at least 50% of the connecting wall along the length of the second intersecting curve is convexly curved.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 3:
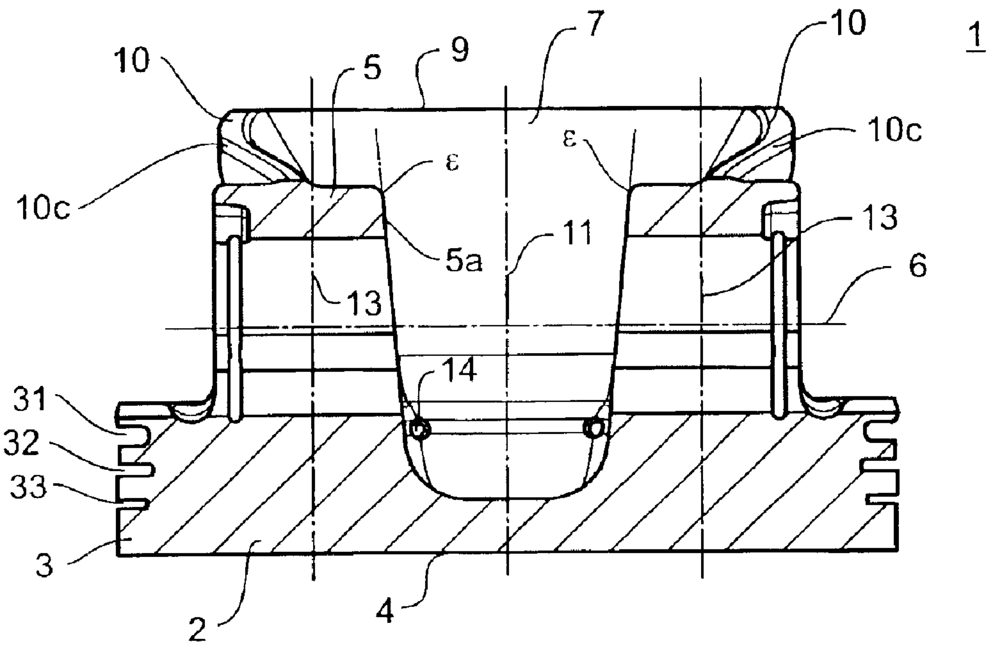
FIG. 3 is a cross sectional view of the piston of FIG. 2 along section line 3—3.
Figure 4:
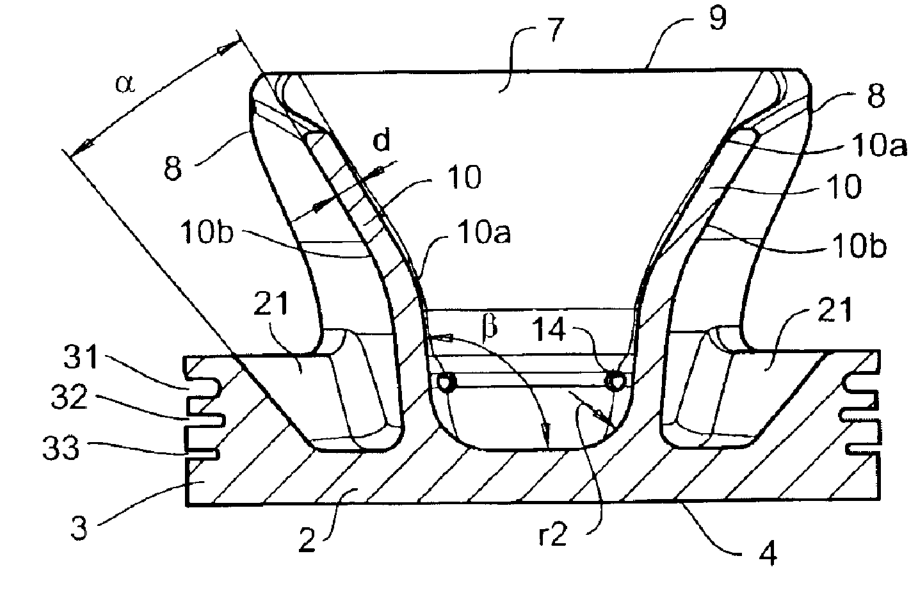
FIG. 4 is a cross sectional view of the piston of FIG. 2 along section line 4—4.
Figure 5:
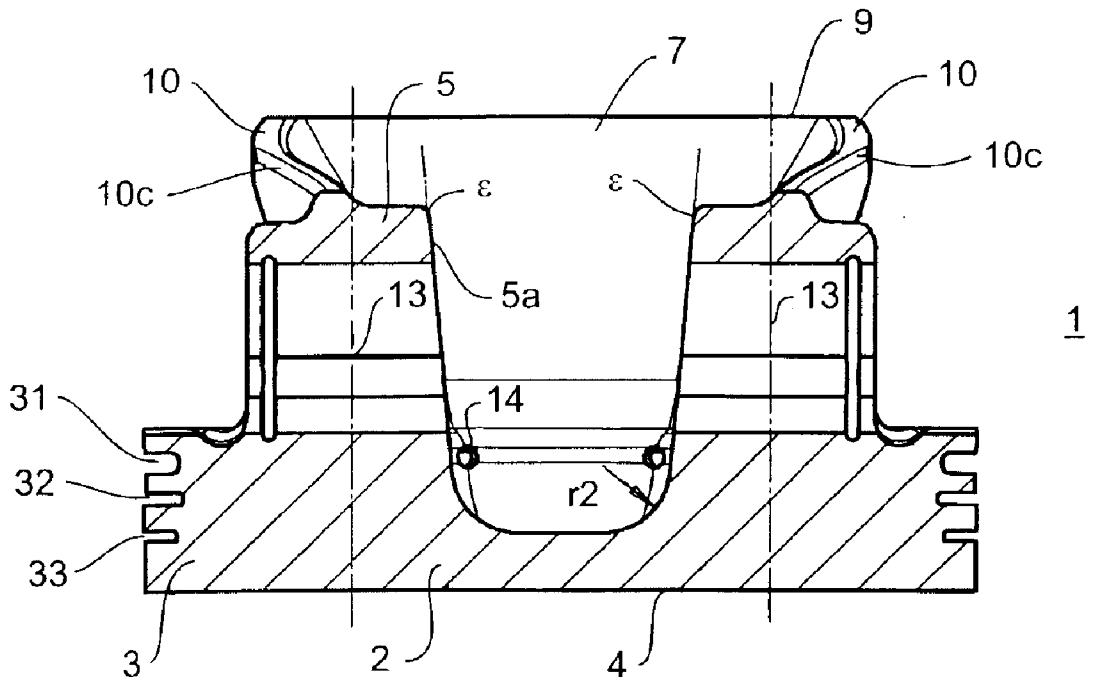
FIG. 5 is a cross sectional view of the piston of FIG. 2 along section line 5—5.
Figure 6:
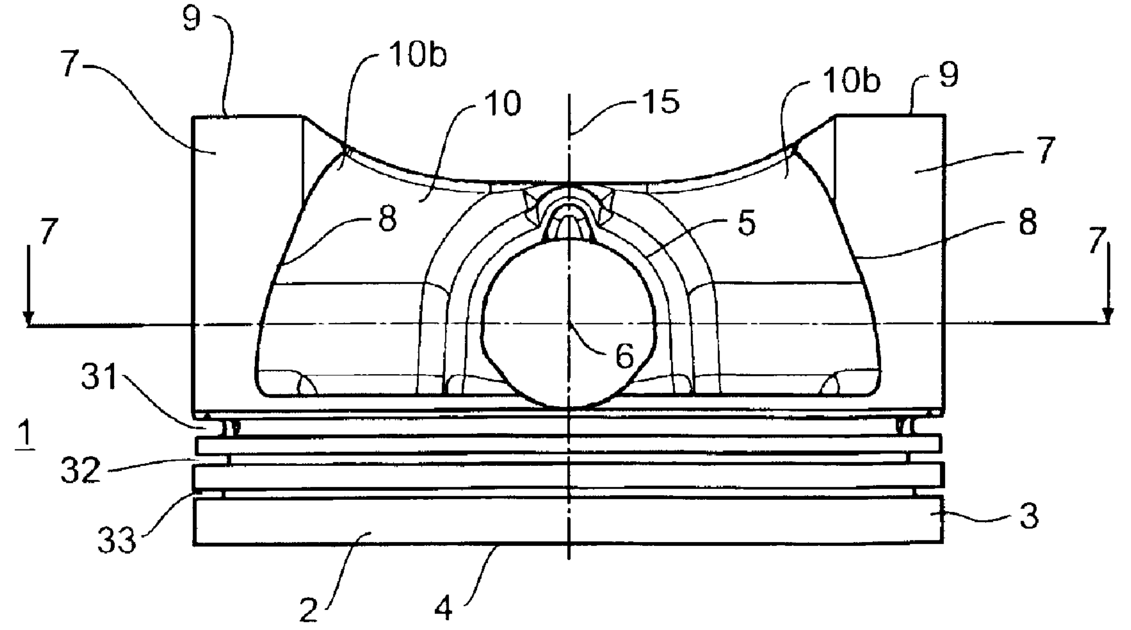
FIG. 6 a side view of the piston of FIG. 1.
Figure 7:
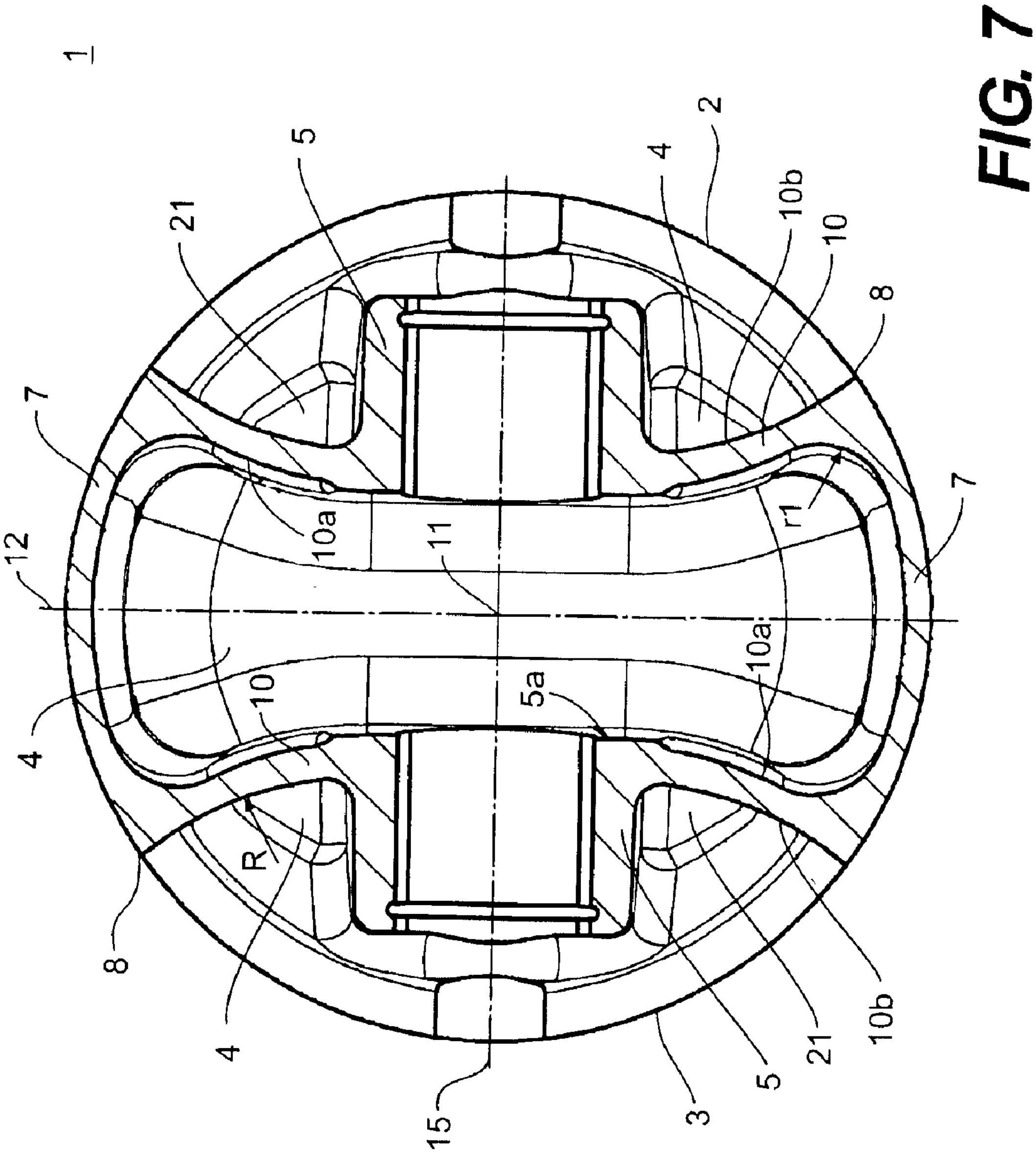
FIG. 7 is a cross sectional view of the piston of FIG. 6 along section line 7—7.

A piston 1 in accordance with the present invention will now be described in greater detail. The piston 1 includes a piston head 2. The piston 1 includes a piston axis 11. The piston 1 is slidably received within a cylinder (not shown). In accordance with a preferred embodiment, the piston axis 11 corresponds to the cylinder axis of the cylinder. A plane 12 passes through the piston axis 11. Each piston 1 is preferably symmetrical with respect to the plane 12. The present invention, however, is not limited to a symmetrical arrangement; rather, asymmetrical and unsymmetrical pistons are considered to be well within the scope of the present invention. The top surface of the piston head 2 includes a combustion surface 4. The combustion surface 4 forms the lower surface of the combustion chamber (not shown) in the internal combustion engine. The side surface of the piston head 2 forms a cylindrical piston ring carrier 3 having a plurality of grooves 31, 32 and 33 formed therein, as shown in FIGS. 3–6. Oil drain-off drillings 14 for an oil scraper ring bear positioned groove 31 extend from the groove 31 to the interior of the piston head 2, as shown in FIGS. 3–5. A pair of piston pin bosses 5 are formed on the underside of the piston head 2, as shown in FIGS. 1, 3 and 5–7. The piston pin bosses 5 are located on opposing sides of the plane 12. The piston pin bosses 5 receive the piston pin (not shown). The piston 1 is connected to the crankshaft through the piston pin and a connecting rod. The piston pin bosses 5 have a common boss axis 6. Each piston boss 5 includes an inner lateral face 5*a*. The inner lateral face 5*a* of one boss 5 is spaced from the inner lateral face 5*a* of the opposing boss 5, as shown in FIGS. 3, 5 and 7. The piston axis 11 and the common boss axis 6 lie in a plane 15. The plane 15 is orthogonal to the plane 12.

Figure 2:
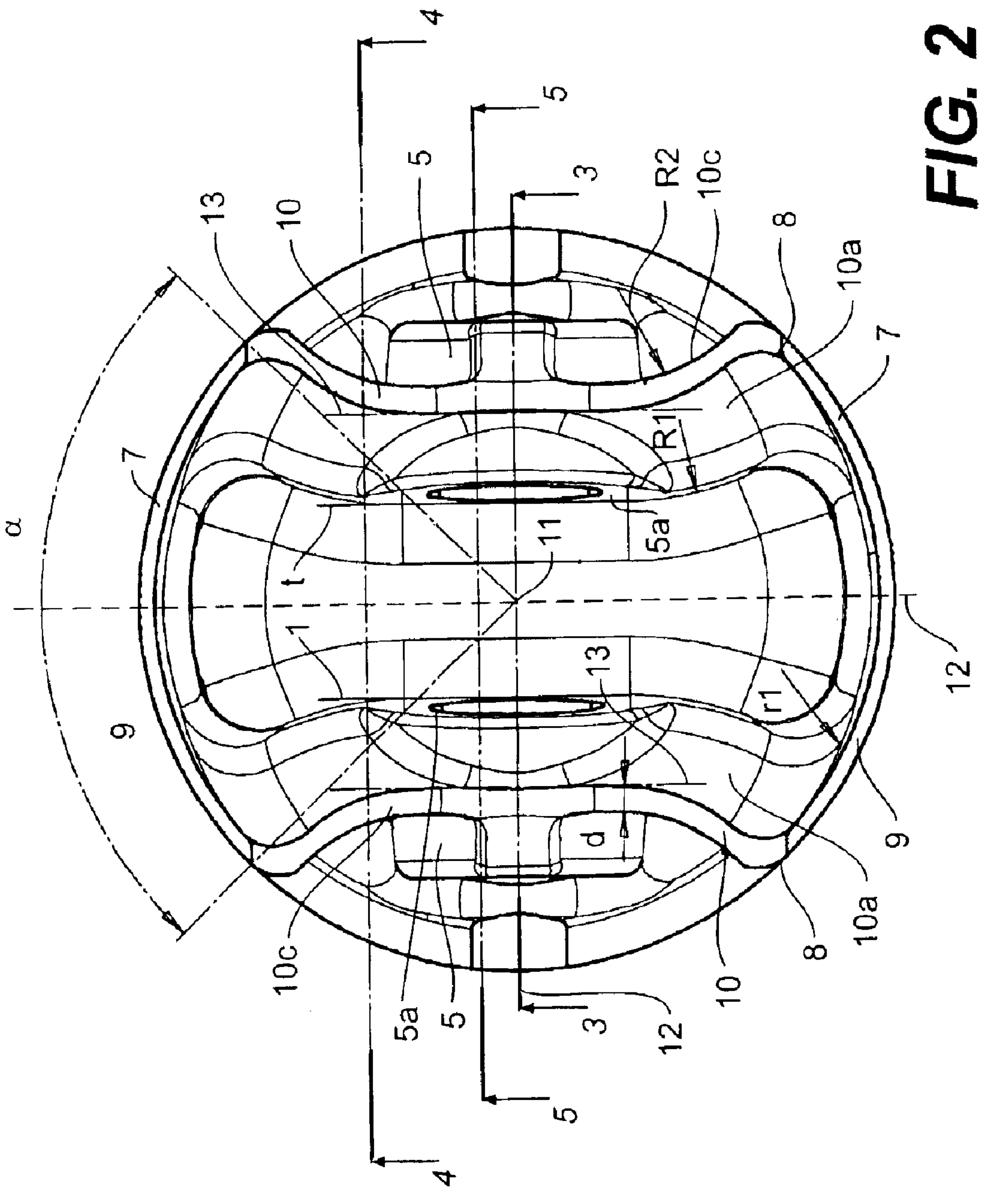
FIG. 2 is a bottom of the piston of FIG. 2.

The piston 1 includes a pair of supporting skirt sections 7. As shown in FIGS. 2 and 7, the supporting skirt sections 7 are positioned on opposite side of the common boss axis 6 and the plane 15. The supporting skirt portions 7 extend from a lower side of the piston head 2 and are immediately adjacent to the piston ring carrier 3. The skirt sections 7 stabilize the piston 1 in a cylinder (not shown) during engine operation to keep the piston 1 aligned within the cylinder. The skirt sections 7 are connected to the piston pin bosses 5 by connecting walls 10.

Figure 1:
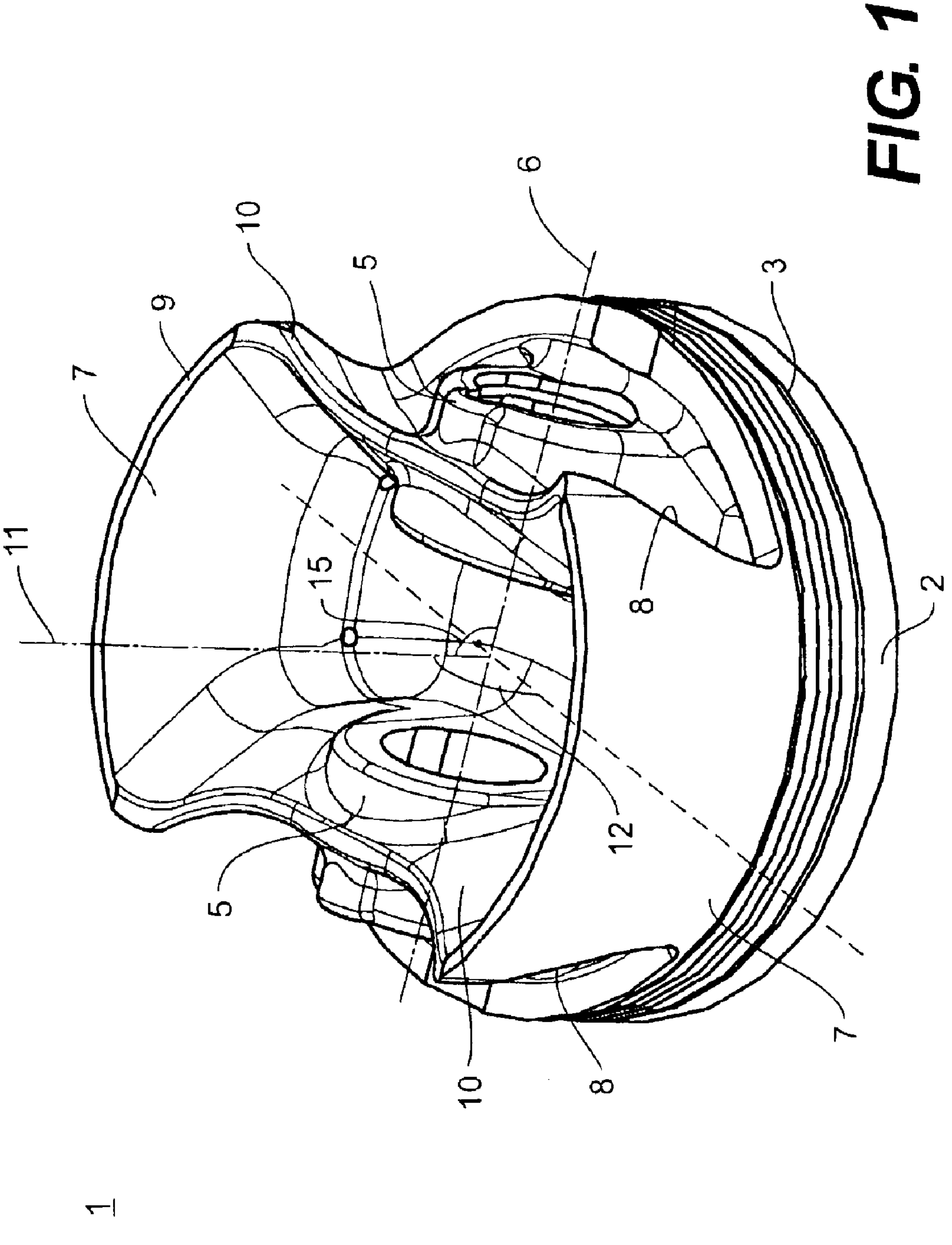
FIG. 1 is an oblique perspective view of a bottom of a piston in accordance with the present invention.

The geometry of the skirt sections 7 will now be described in great detail. As shown in FIGS. 1, 4 and 6, the skirt sections have a tapered profile. The edges 8 of the skirt sections 7 taper from a foot or lower portion 9 towards the piston head 2. The periphery of each skirt section 7 is greater at the lower portion 9 than it is in the area adjacent the piston ring carrier 3 (i.e., the width of the skirt sections 8 increases as the distance from the underside of the piston head 2 increases). An angle of spread α exists between the edges 8 of the skirt 7 and the piston axis 11, as shown in FIG. 2. Resilient support for the piston skirts 7 is facilitated if the angle α at least 40°. Preferably, the angle α is at least 45° near the edges 8 adjacent the piston head 2. The angle α increases as the distance from the piston head 2 increases.

A pair of connecting walls 10 are located on opposing sides of the plane 12. Each connecting wall 10 extends from a free edge 8 of one skirt section 7 to another free edge 8 on the opposing skirt section 7, as shown in FIGS. 1 and 2. The geometry of the connecting walls 10 will now be described in greater detail. Each connecting wall 10 is connected to the ends 8 of the opposing skirt sections 7, one piston pin boss 5 located there between and the undersurface of the piston head 2. The connecting walls 10 extend at an angle β with respect to the piston head 2, as shown in FIG. 4. The angle β is preferably between 90° and 120°. This relationship assists in minimizing stress in the transition area. For optimum stress reduction in the transition area, the angle β should be close to 90°.

Each connecting wall 10 includes an inner surface 10*a*, and outer surface 10*b* and a foot or lower portion 10*c*. The lower portion 10*c* is spaced from the piston head 2. When viewed from the plane 12, the connecting walls 10 flare away from the plane 12 such that the portion of the connecting wall 10 adjacent the underside of the piston head 2 is located nearest the plane 12. The lower portion 10*c* is spaced farther from the plane 12. Each connecting wall 10 is at least partially curved with respect to the common boss axis 6, the plane 12, the plane 15 and the piston axis 11 of the piston 1. When viewed from the plane 15, the connecting walls 10 flare in a generally outward direction away from the axis 11 and the plane 12. With such an arrangement, at least a portion of the inner surface 10*a* of the connecting walls 10 has a convex curvature when viewed from plane 12. The inner surface 10*a* of the connecting walls 10 are convexly curved with respect to a first reference plane that is parallel to plane 15 and a second reference plane that is perpendicular to both the plane 12 and the plane 15. In accordance with the present invention, the first reference plane may be located at any distance from the plane 15. The second reference plane may be located at any point below the underside of the piston head 2. Each of the first and second reference planes intersects the connecting wall 10 along an intersection curve. In accordance with the present invention, along the length of the intersection curves at least 15% of the inner surface 10*a* has a convex curvature. It is more preferable that at least 25% of the inner surface 10*a* has a convex curvature along the length of the intersection curves. It is even more preferable that at least 50% of the inner surface 10*b* has a convex curvature along the length of the intersection curves. As illustrated, the curvature of the connecting walls 10 increases as the distance from the plane 15 increases. Although preferred, the present invention is not limited to this arrangement, other curvatures are possible and considered to be well within the scope of the present invention. At least a portion of each connecting wall 10 flares away from the plane 15. As such, when viewed from the underside of the piston head 2, as shown in FIG. 4, the connecting walls 10 flare in a generally radially outward direction. This forms a twofold curvature of each connecting wall 10. The overall curvature is generally cup shaped when viewed from below, as shown in FIG. 1. The outer surface 10*b* of the connecting walls 10 have a generally concave curvature when viewed from the outside of the piston 1. The two fold curvature of the connecting walls 10 preferably extends from the underside of the piston head 2. According to a preferred embodiment at least a portion of each connecting wall 10 is convexly curved, preferably in a two fold convexly curvature, when viewed from plane 12 at a point between the underside of the piston head 2 and a plane that is perpendicular to planes 12 and 15 and containing the axis 6.

According to a preferred embodiment of the present invention, each connecting wall 10 has a radius of curvature R that varies along the connecting wall. The radius of curvature R1 for the connecting wall 10 in the area adjacent the piston head 2 is greater than the radius of curvature R2 adjacent the lower portion 10*c*. This variation in the radius R permits the distance between the walls 10 to be minimized to reduce stresses in the transition area between the bosses 5 and piston head 2 while maximizing the distance between the walls 10 supporting the skirts 7. This further assists in minimizing stresses in the transition area. The present invention, however, is not limited to R1>R2; rather, R1=R2 and R1<R2 are considered to be well within the scope of the present invention.

A curvature is formed in the inner transition area between the skirt 7 and connecting wall 10, as shown in FIGS. 2, 4, 5 and 7. This curvature has radii r1 and r2. It is desirable that these radii r1 and r2 be made as large as possible. The radius r1 should be sufficiently large to avoid unnecessary stress concentrations. It is preferable that the radius r1 be approximately two times the width of the connecting wall 10. The radius r2 should be made as large as possible in order to reduce the stress concentration in the transition area between the connecting wall 10 and the bottom of the piston head 2. The size of the radius r2, however, is limited by the position of the boss 5 and the connecting rod (not shown).

Each connecting wall 10 has a tangential plane ϵ adjacent the inner lateral face 5*a*. A portion of the inner surface 10*a* of the connecting wall 10 near the piston head 2 continuously merges into the inner lateral face 5*a* of the boss 5. The inner lateral face 5*a* lies within the tangential plane ϵ. At this point, the connecting walls 10 are at there closest. This is the smallest possible distance between the connecting walls 10. This minimizes the stresses in the transition area formed between the piston 5 and piston head 2. Each boss 5 has a plane 13 that is perpendicular to the common boss axis 6. The plane 13 is located approximately at the middle of the boss 5. The connecting walls 10 are configured such that the area adjacent the lower portion 10*c* intersects the piston pin boss 5 near the plane 13, as shown in FIGS. 2, 3 and 5. This arrangement ensures the optimal support of the piston pin bosses 5.

The tapered shape of the edges 8 of the skirt sections 7 and the twofold curvature of the connecting walls 10 permit each skirt 7 to be connected at the lower portion 9 at the furthest possible distance between the walls 10. This achieves the desired flexible or variable or soft support for the skirt sections such that the skirt sections maintain sufficient contact with the sides of the combustion chamber. This also reduces piston noise.

The piston 1 is preferably molded from aluminum to produce a light weight construction. The present invention, however, is not limited to the use of aluminum; rather, alloys of aluminum, carbon, cast iron, titanium, ceramics, steels and light weight alloys are considered to be well within the scope of the present invention. In order to reduce weight, pockets 21 are molded into the underside of the piston head 2, on both sides of the piston pin bosses 5, between the outer side 10*b* of the connecting walls 10 and the piston ring carrier 3, as shown in FIGS. 4 and 7. In order to facilitate removal of the piston 1 from the mold, it is important that the mold has sloped of opposing surfaces that are at an angle γ of >0°. The angle γ is preferably >2°. Because of the two-fold curved connecting walls 10 between the skirt sections 7, it is possible to realize a light weight piston that is extremely durable and provides soft support for the skirt sections 7.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Although it is not preferred, it is contemplated that only one of the connecting walls described above may have the flared construction. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. A piston for an internal combustion engine, comprising:

a piston head having an underside, wherein the piston head includes a piston axis extending in a generally longitudinal direction;

a piston ring carrier extending from the underside of the piston head, wherein the piston ring carrier has an outer periphery;

a pair of piston pin bosses, wherein the piston pin bosses are arranged along a boss axis in a spaced apart relationship, wherein the boss axis is substantially perpendicular to the piston axis, wherein the piston includes a first plane containing the piston axis and the boss axis, a second plane extends substantially perpendicular to the first plane, wherein the second plane contains the piston axis, wherein the one piston pin boss is located on one side of the second plane and the other piston pin boss is located on an opposite side of the second plane;

a pair of piston skirts extending from the outer periphery of the piston ring carrier, wherein one of the pair of piston skirts is located on one side of the first plane and another of the piston skirts is located on an opposite side of the first plane, wherein each piston skirt includes a free end and a pair of opposed edges; and a pair of connecting walls extending from one of the piston skirts on one side of the first plane, across a piston pin boss to the other piston skirt on the opposite side of the first plane, wherein each connecting wall is connected to the piston head, wherein at least a portion of at least one of the connecting walls flares away from the piston axis, the first plane and the second plane.

2. The piston according to claim 1, wherein at least a portion of both of the connecting walls flares away from the piston axis, the first plane and the second plane.

3. The piston according to claim 1, wherein at least a portion of the at least one of the connecting walls flares away from the second plane such that a portion of the connecting wall located adjacent the underside of the piston head is located closer to the second plane than an opposite end of the connecting wall.

4. The piston according to claim 1, wherein each connecting wall has an inner surface, an outer surface and a lower portion spaced from the underside of the piston head, wherein the inner surface of one connecting wall is positioned opposite the inner surface of the other connecting wall, wherein at least a portion of the inner surface having a convex curvature with respect to the second plane.

5. The piston according to claim 4, wherein at least a portion of the lower portion of the connecting wall is spaced a greater distance from the piston axis as compared to a corresponding portion of the connecting wall located adjacent the underside of the piston head.

6. The piston according to claim 4, wherein each of the connecting walls flares in a generally outward direction from the portion located adjacent the underside of the piston head to the lower portion.

7. The piston according to claim 1, wherein each piston pin boss has a plane extending there through adjacent a middle portion of thereof, wherein the plane is generally orthogonal to the axis, wherein the each connecting wall bisects one of the piston pin bosses between the plane and an inner end surface of the piston pin boss.

8. The piston according to claim 1, wherein each of the piston skirts is tapered such that the distance between the opposing edges adjacent the free ends is greater than distance between the opposing edges adjacent the piston ring carrier.

9. The piston according to claim 8, wherein each of connecting walls is curved to follow a contour of the opposing edge.

10. The piston according to claim 9, wherein each connecting wall has an inner surface, an outer surface and a lower portion spaced from the underside of the piston head, wherein the inner surface of one connecting wall is positioned opposite the inner surface of the other connecting wall, wherein at least a portion of the inner surface having a convex curvature with respect to the second plane.

11. The piston according to claim 1, wherein the at least a portion of at least one of the connecting wails is positioned between the underside of the piston head and a boss plane, the boss plane being perpendicular to the piston axis and including the boss axis.

12. A piston for an internal combustion engine, comprising:

a piston head having an underside;

a piston ring carrier extending from the underside of the piston head, wherein the piston ring has an outer periphery;

a pair of piston pin bosses, wherein each piston pin boss is arranged along a boss axis in a spaced apart relationship;

a pair of piston skirts extending from the outer periphery of the piston ring carrier, wherein each piston skirt includes a free end and a pair of opposed edges, wherein the each of the opposed edges extends from the piston ring carrier to the free end, wherein each of the piston skirts is tapered such that the distance between the opposing edges adjacent the free end is greater than distance between the opposing edges adjacent the piston ring carrier, wherein one of the piston skirts is positioned on one side of the axis and the other of the piston skirts is positioned on the other side of the axis; and a pair of connecting walls, wherein each connecting wall extends from one of the pair of piston skirts across one of the pair of piston pin bosses to other of the pair of piston skirts, wherein each connecting wall is connected to the piston head, wherein each connecting wall is connected to the piston skirt along the entire length of the tapered opposing edge; and wherein the piston head includes a piston axis extending in a generally longitudinal direction, wherein the boss axis is substantially perpendicular to the piston axis, wherein the piston includes a first plane containing the piston axis and the boss axis, and a second plane that extends substantially perpendicular to the first plane, wherein the second plane contains the piston axis, wherein the one piston pin boss is located on one side of the second plane and the other piston pin boss is located on an opposite side of the second plane, wherein the pair of piston skirts are located on an opposite side of the first plane, wherein at least a portion of at least one of the connecting walls flares away from the piston axis, the first plane and the second plane.

13. The piston according to claim 12, wherein at least a portion of both of the connecting walls flares away from the piston axis, the first plane and the second plane.

14. The piston according to claim 12, wherein at least a portion of the at least one of the connecting walls flares away from the second plane such that a portion of the connecting wall located adjacent the underside of the piston head is located closer to the second plane than an opposite end of the connecting wall.

15. The piston according to claim 12, wherein each connecting wall has an inner surface, an outer surface and a lower portion spaced from the underside of the piston head, wherein the inner surface of one connecting wall is positioned opposite the inner surface of the other connecting wall, wherein at least a portion of the inner surface having a convex curvature with respect to the second plane.

16. The piston according to claim 15, wherein at least a portion of the lower portion of the connecting wall is spaced a greater distance from the piston axis as compared to a corresponding portion of the connecting wall located adjacent the underside of the piston head.

17. The piston according to claim 15, wherein each of the connecting walls flares in a generally outward direction from the portion located adjacent the underside of the piston head to the lower portion.

18. A piston for an internal combustion engine, comprising:

a piston head having an underside, wherein the piston head includes a piston axis extending in a generally longitudinal direction;

a piston ring carrier extending from the underside of the piston head, wherein the piston ring carrier has an outer periphery;

a pair of piston pin bosses, wherein the piston pin bosses are arranged along a boss axis in a spaced apart relationship, wherein the boss axis is substantially perpendicular to the piston axis, wherein the piston includes a first plane containing the piston axis and the boss axis, wherein the one piston pin boss is located on one side of the piston axis and the other piston pin boss is located on an opposite side of the piston axis;

a pair of piston skirts extending from the outer periphery of the piston ring carrier, wherein one of the pair of piston skirts is located on one side of the first plane and another of the piston skirts is located on an opposite side of the first plane, wherein each piston skirt includes a free end and a pair of opposed edges; and a pair of connecting walls extending from one of the piston skirts on one side of the first plane, across a piston pin boss to the other piston skirt on the opposite side of the first plane, wherein each connecting wall is connected to the piston head, wherein a first reference plane extends generally parallel to and spaced from the first plane, wherein the first reference plane intersects each of the connecting walls along an intersecting curve, wherein each of the connecting walls is at least partially convexly curved with respect to the opposing connecting wall at the intersecting curve.

19. The piston according to claim 18, wherein the intersecting curve has a length, wherein at least 15% of the connecting wail along the length of the intersecting curve is convexly curved.

20. The piston according to claim 19, wherein at least 25% of the connecting wall along the length of the intersecting curve is convexly curved.

21. The piston according to claim 20, wherein at least 50% of the connecting wall along the length of the intersecting curve is convexly curved.

22. The piston according to claim 18, wherein a second reference plane generally orthogonal to the first plane and the first reference plane, wherein the second reference plane intersects each of the connecting walls along a second intersecting curve, wherein each of the connecting walls is at least partially convexly curved with respect to the opposing connecting wall at the second intersecting curve.

23. The piston according to claim 22, wherein the second intersecting curve has a length, wherein at least 15% of the connecting wall along the length of the second intersecting curve is convexly curved.

24. The piston according to claim 23, wherein at least 25% of the connecting wall along the length of the second intersecting curve is convexly curved.

25. The piston according to claim 24, wherein at least 50% of the connecting wall along the length of the second intersecting curve is convexly curved.

26. The piston according to claim 22, wherein at least a portion of the connecting wall between the underside of the piston head and the second reference plane is at least partially convexly curved with respect to the opposing connecting wail.

27. The piston according to claim 22, wherein the convex curvature of each of the connecting walls at the first intersecting curves is positioned between the piston head and a boss plane, the boss plane being perpendicular to the piston axis and including the boss axis.

28. The piston according to claim 18, wherein at least a portion of the connecting wall between the underside of the piston head and the piston axis is at least partially convexly curved with respect to the opposing connecting wall.

* * * * *

UNITED STATES PATENT AND TRADEMARK OFFICE

CERTIFICATE OF CORRECTION

PATENT NO. : 6,862,977 B2
APPLICATION NO. : 10/395719
DATED : March 8, 2005
INVENTOR(S) : Karl Glinsner and Martin Olejniczak It is certified that error appears in the above-identified patent and that said Letters Patent is hereby corrected as shown below:

On the Title page of the Patent Grant,

Line (73) Assignee: ERP-Rotax GmbH & Co. KG, should read -- BRP-Rotax GmbH & Co. KG. --

Signed and Sealed this

Twentieth Day of January, 2009

JON W. DUDAS
*Director of the United States Patent and Trademark Office*